United States Patent Office 3,663,603
Patented May 16, 1972

3,663,603
HYDRAZINE-CARBOXYLIC ACID ESTERS AND PROCESS FOR THE PRODUCTION THEREOF
Erwin Müller and Wolfgang Heydkamp, Leverkusen, Germany, assignors to Farbenfabriken Bayer Aktiengesellschaft, Leverkusen, Germany
No Drawing. Filed Mar. 12, 1968, Ser. No. 712,355
Claims priority, application Germany, Mar. 25, 1967, F 51,948
Int. Cl. C07c *133/00*
U.S. Cl. 260—482 B          7 Claims

ABSTRACT OF THE DISCLOSURE

Polyhydrazine-monocarboxylic acid esters and a process for their production by reacting a polymonophenyl carbonate of a polyhydric alcohol with hydrazine or hydrazine hydrate.

---

The present invention relates to a process for the production of novel hydrazine-carboxylic acid esters, i.e. polyhydrazine-monocarboxylic acid esters of polyhydric alcohols of the formula

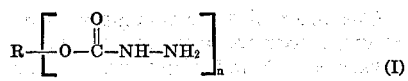

wherein
R=an alkylene end groups-containing hydrocarbon, ether, polyether, thioether, polythioether, ester or polyester radical, and
$n$=a whole number from 2 to 6.

It is known from Ber. 47, 2186 (1914) and German patent specification No. 285,800 (1914) (Friedlaender 12, 95), that dialkyl- and diaryl-carbonates readily react with hydrazine or hydrazine hydrate with the formation of the corresponding hydrazine-monocarboxylic acid-alkyl or -aryl esters while splitting off one mol of alcanol or phenol.

However, if, for example, 2 mols hydrazine or hydrazine hydrate are allowed to act upon 1 mol alkylene-bis-(mono-alkylcarbonate), then there is obtained a mixture of alkylene - bis - hydrazine - monocarboxylic acid ester, hydroxyalkylene - hydrazine - monocarboxylic acid ester, hydrazine-monocarboxylic acid alkyl ester, glycol and alcanol. This process is, therefore, not suitable for the production of polyhydrazine-monocarboxylic acid esters of polyhydric alcohols.

The object of the invention comprises a process for the production of the above-mentioned novel hydrazine-carboxylic acid esters by the reaction of diesters of carbonic acid with hydrazine or hydrazine hydrate. This process is characterised by reacting 1 mol of a polymonophenyl-carbonate of a polyhydric alcohol of the formula

wherein R and $n$ has the meaning as in the above-mentioned Formula I
with $n$ mols of hydrazine or hydrazine hydrate.

This process is based on the finding that the aryl-carbonate group can be reacted substantially more readily than the alkyl-carbonate group under the action of hydrazine or hydrazine hydrate upon alkyl/aryl mixed polycarbonates. It follows that, according to the present process, the polyhydrazine-monocarboxylic acid esters of polyhydric alcohols are obtained in high yields and, to a large extent, without formation of secondary products.

The reaction takes place already at room temperature. It is, however, also possible to work at moderately elevated temperatures up to about 100° C.

The reaction may be carried out in the presence of solvents such as alcohols, for example, methanol, ethanol, propanol, isopropanol, cyclohexanol and glycol, and ethers such as glycolmonomethylether, glycoldibutylether and dioxane.

The phenol liberated in the reaction can be distilled off at temperatures below about 150° C., preferably under reduced pressure, or it can be removed from the reaction mixture by means of solvents, such as benzene, toluene, xylene and chlorobenzene.

Suitable polymonoaryl-carbonates of polyhydric alcohols are, for example, the polyphenyl-, -chlorophenyl-, -cresyl- and -xylenyl-carbonates of the following polyhydric alcohols, for example: ethylene glycol, the polyethylene glycols, 1,2- and 1,3-propylene glycol and the polypropylene glycols, the polybutylene glycols as well as the higher molecular weight polyethers and -thioethers containing two or more free, aliphatically bound hydroxyl groups, butanediol-1,3 and -1,4 pentanediols, hexanediols, cyclopentane- and cyclohexanediols, glycerol, trimethylolethane, -propane, -butane etc. quinitol, sorbitol as well as polyesters, including the polycarbonates containing at least two free, aliphatically bound hydroxyl groups, thus e.g. succinic acid, glutaric acid, adipic acid, pimelic acid, suberic acid, azelaic acid, sebacic acid, maleic acid, fumaric acid, citraconic acid, mesaconic acid, itaconic acid, phthalic acid, isophthalic acid and terephthalic acid, -ethylene glycol, -polyethylene glycol, -butanediol, -hexanediol, -hexanediol - 1,6 - β - hydroxy ethyl ether, -glycerol and -trimethylol-propane di- or polyesters with at least two free hydroxyl groups.

The process is preferably started from di- or polymonoaryl-carbonates of polyhydric alcohols of molecular weights of at least about 500, particularly up to about 3000, since the polyhydrazine-monocarboxylic acid esters obtainable therefrom are of special technical interest, particularly as intermediates for the production of high molecular weight polycondensation or addition compounds.

When using polymonoaryl-carbonates of hydroxyl group-containing polyesters, it is noteworthy that the ester groups are not attacked by the action of hydrazine or hydrazine hydrate, i.e. they are not split hydrazinolytically. These products are, surprisingly, also stable to storage.

The polymonoaryl-carbonates of polyhydric alcohols can be prepared by the reaction of the corresponding di- or polychlorocarbonic acid esters of polyhydric alcohols with the corresponding phenols, or by the reaction of the corresponding di- or polyalcohols with the corresponding chlorocarbonic acid esters of phenols in the presence of hydrochloride-binding agents, or by transesterification of the corresponding diaryl-carbonates with di- or poly-alcohols with the splitting off of one mol phenol for each mol diaryl-carbonate.

The products of the present process are of an oily, wax- or resin-like nature and can be used, besides as intermediates for further syntheses, as stabilisers of polyvinyl chloride, for example.

EXAMPLE 1

302 g. (1 mol) of the ethylene-bis-monophenyl-carbonate (M.P. 102° C.) prepared by the reaction of one mol ethylenedichlorocarbonic acid ester with two mols phenol in an aqueous sodium hydroxide solution, are dissolved in 500 cc. ethanol. Into this solution there are introduced dropwise at 20° C., while stirring, 100 g. hydrazine hydrate (2 mols). The temperature thereby rises to about 50° C. The mixture is boiled under reflux for a further 45 minutes, the precipitated solid reaction product is filtered off with suction and recrystallised from dimethyl formamide Yield: 140 g.

$$H_2N-HN-OCO-(CH_2)_2-OCO-NH-NH_2$$

(mol weight 178); M.P. 133° C.

EXAMPLE 2

330 g. (1 mol) of the butylene-bis-monophenyl-carbonate (M.P. 84° C.) prepared by the reaction of one mol 1,4-butanedichlorocarbonic acid ester with two mols phenol in an aqueous-alkaline solution, are dissolved in 1.5 litres ethanols. Into this solution there are introduced dropwise at 20° C., while stirring, 100 g. (2 mols) hydrazine hydrate. The temperature thereby rises to about 50° C. The mixture is boiled under reflux for a further 45 minutes, the precipitated solid reaction product is filtered off with suction and recrystallised from dimethyl formamide. Yield: 168 g.

$$H_2N-HN-OCO-(CH_2)_4-OCO-NH-NH_2$$

(mol weight 206); M.P. 130° C.

EXAMPLE 3

384 g. (1 mol) of the hexahydro-p-xylylene-bis-monophenylcarbonate (M.P. 157° C.) prepared by the reaction of one mol hexahydro-p-xylylene-dichlorocarbonic acid ester with two mols phenol in an aqueous-alkaline solution, are dissolved in 1 litre ethanol. Into this solution there are introduced dropwise at 50° C., while stirring, 100 g. (2 mols) hydrazine hydrate. The mixture is boiled under reflux for a further 45 minutes, allowed to cool, the precipitated reaction product is filtered off with suction and recrystallised from butanol. Yield: 261 g.

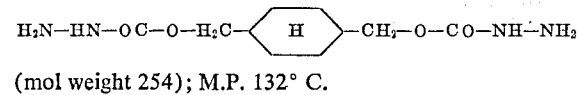

(mol weight 254); M.P. 132° C.

EXAMPLE 4

Bis-monophenyl-carbonate is prepared by heating 0.5 mol of a linear polypropylene ether of the hydroxyl number 56 with 1 mol chlorocarbonic acid phenyl ester to 140 to 200° C., while stirring and blowing through nitrogen, and 0.5 mol of the bis-monophenyl-carbonate of this polypropylene ether are admixed dropwise at 20° C., while stirring, with 1 mol hydrazine-hydrate, and the mixture is then heated at 80° C. for a further two hours. The water is then drawn off under a pressure of 12 mm. Hg and the eliminated phenol under a pressure of 0.1 mm. Hg at an external temperature of 100 to 150° C. The residual oil has a $NH_2$ number of 57.

EXAMPLE 5

A linear polycarbonate with the hydroxyl number 56 is obtained by the reaction of hexanediol-1,6 with diphenyl-carbonate, and the bis-monophenyl-carbonate of this polycarbonate is obtained by the reaction of this polycarbonate with 2 mols diphenyl-carbonate; one mol of the bis-monophenyl-carbonate is admixed dropwise at 50° C., while stirring, with 2 mols hydrazine hydrate. The temperature is maintained at 70 to 80° C. for a further hour, the water is then distilled off in a vacuum and the eliminated phenol under a pressure of 0.1 mm. Hg at 65 to 70° C. (bath temperature 110 to 150° C.). A wax-like product of softening point 49 to 50° C. and the $NH_2$ number 61 is obtained.

EXAMPLE 6

One mol of a linear polycarbonate with the hydroxy number 56.4, prepared from diethylene-glycol and diphenyl-carbonate, is reacted with 2 mols diphenyl-carbonate to give the bis-monophenyl-carbonate of this polycarbonate, and 2 mols hydrazine hydrate are then added dropwise under the conditions described in Example 5. A viscous oil with the $NH_2$ number 61 is obtained.

EXAMPLE 7

A linear polyester with the hydroxy number 136 is prepared from hexanediol-1,6 and adipic acid, the bis-monophenyl-carbonate of this polyester is obtained by the reaction of one mol of the polyester with 2 mols diphenylcarbonate; two mols hydrazine hydrate are added dropwise at 40° C., while stirring, to one mol of the bis-monophenyl-carbonate. After further stirring for 1 hour at 80° C., the water is drawn off in a vacuum, the phenol under a pressure of 0.1 mm. Hg and at 65 to 70° C. (bath temperature 110 to 150° C.), and a wax-like product of softening point 41° C. and the $NH_2$ number 138 is obtained.

EXAMPLE 8

A linear polyester with the hydroxyl number 63.5 is prepared from hexanediol-1,6- and neopentyl-glycol, in a molecular ratio 11:6, with adipic acid; the bis-monophenyl-carbonate of this polyester is obtained by the reaction of one mol of the polyester with 2 mols diphenyl-carbonate. After further stirring for one hour at 80° C., the water is drawn off in vacuum, and the eliminated phenol under a pressure of 0.1 mm. Hg and at 65 to 70° C. (bath temperature 110 to 150° C.). A wax-like product of softening point 28 to 30° C. and the $NH_2$ number 62 is obtained.

EXAMPLE 9

One mole of a bis-monophenyl-carbonate of a linear polyester with the hydroxyl number 136, obtained from hexanediol-1,6 and adipic acid, the molecular weight of which was increased to 1940 by the reaction with toluylene-di-isocyante (hydroxy number 58), is reacted with 2 mols hydrazine hydrate under the conditions described in Example 5. A wax-like product of softening point 39° C. and the $NH_2$ number 60 is obtained.

EXAMPLE 10

A polyester with the hydroxyl number 239 and the acid number 1 is prepared from trimethylolpropane, adipic acid and phthalic anhydride (molecular ratio 8:5:1), and this polyester is reacted with diphenyl-carbonate to give the corresponding polymonophenyl-carbonate. To the latter there is added dropwise at 80° C., while stirring, an amount of hydrazine hydrate corresponding to the number of carbonate groups. After distilling off the water and the eliminated phenol, a resin with the $NH_2$ number 301 is obtained.

We claim:

1. A polyhydrazine-carboxylic acid ester of the formula

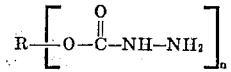

wherein R is an n-valent residue of a polyethylene, polypropylene or polybutylene ether having a molecular weight from about 500 to about 3,000 or an n-valent residue of a linear polyester having a molecular weight from about 500 to about 3,000 which has at least two free OH groups aliphatically bound thereto and is the reaction product of a member selected from the group consisting of succinic acid, glutaric acid, adipic acid, pimelic acid, suberic acid, azelaic acid, sebacic acid, maleic acid, fumaric acid, citraonic acid, mestconic acid, itaconic acid, phthalic acid, isophthalic acid and terephthalic acid with a member selected from the group consisting of ethylene glycol, polyethylene glycol, butanediol, hexanediol, hexanediol-1,6-β-hydroxyethyl ether, glycerol and trimethylol propane and n is a whole number of from 2 to 6.

2. The ester of claim 1 wherein R is the residue of a polypropylene ether.

3. A process for producing polyhydrazine-carboxylic acid esters of the formula

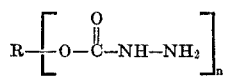

which comprises reacting 1 mol of a compound of the formula

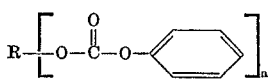

wherein R is an n-valent residue of a polyethylene, polypropylene or polybutylene ether having a molecular weight from about 500 to about 3,000 or an n-valent residue of a linear polyester having a molecular weight from about 500 to about 3,000 which has at least two free OH groups aliphatically bound thereto and is the reaction product of a member selected from the group consisting of succinic acid, glutaric acid, adipic acid, pimelic acid, suberic acid, azelaic acid, sebacic acid, maleic acid, fumaric acid, citraconic acid, mesaconic acid, itaconic acid, phthalic acid, isophthalic acid and terephthalic acid with a member selected from the group consisting of ethylene glycol, polyethylene glycol, butanediol, hexanediol, hexanediol-1,6-$\beta$-hydroxyethyl ether, glycerol and trimethylol propane and $n$ is a whole number of from 2 to 6 with $n$ mols of hydrazine hydrate and recovering resulting product.

4. The process of claim 3 wherein said reaction is carried out between room temperature and about 100° C.

5. The process of claim 3 wherein phenol by-product is removed by distillation at a temperature below about 150° C.

6. The process of claim 3 wherein the reaction is carried out in the presence of a solvent.

7. The process of claim 3 wherein by-product phenol is removed by extraction with a solvent.

References Cited

UNITED STATES PATENTS 3,287,398  11/1966  Allais et al. _____ 260—482 C

FOREIGN PATENTS 193,303  12/1964  Sverige _____ 260—482 C

LORRAINE A. WEINBERGER, Primary Examiner

P. J. KILLOS, Assistant Examiner

U.S. Cl. X.R.

260—463, 475 P